United States Patent [19]

Chen et al.

[11] Patent Number: 4,809,728
[45] Date of Patent: Mar. 7, 1989

[54] ADJUSTABLE WATER TEMPERATURE CYCLING DEVICE

[76] Inventors: Ying T. Chen, 84 S. Greenwood Ave., #2, Pasadena, Calif. 91107; Mary Z. Luo, 293 N. Hill Ave., #5, Pasadena, Calif. 91106

[21] Appl. No.: 154,973

[22] Filed: Feb. 10, 1988

[51] Int. Cl.[4] .................................................. G05D 11/03
[52] U.S. Cl. ............................ 137/112; 137/624.14; 137/625.41; 415/145
[58] Field of Search .............. 137/112, 110, 624.14, 137/625.41; 4/192; 415/151, 145

[56] References Cited

U.S. PATENT DOCUMENTS

| | | | |
|---|---|---|---|
| 443,532 | 12/1890 | Lund, Jr. | 137/112 |
| 1,304,412 | 5/1919 | Toyokawa | 415/151 |
| 2,044,921 | 6/1936 | Swanland | 137/112 |
| 2,413,002 | 12/1946 | Shurtz | 4/192 |
| 2,651,491 | 9/1953 | Ashton et al. | 137/112 |
| 2,842,399 | 2/1958 | Strahman et al. | 137/112 X |
| 3,458,874 | 8/1969 | Fritz | 4/192 |

Primary Examiner—William E. Tapolcai
Attorney, Agent, or Firm—Albert O. Cota

[57] ABSTRACT

A water temperature cycling device for supplying intermittently hot and cold water for therapeutic benefits which has a cylindrical body (20) internally ported allowing water to drive a turbine (38) supplying rotational force to a rotor (48) through a speed reducing gear train (46). The speed of the cyclic action of the hot and cold water is governed by flow from a control valve (64) bypassing some of the flow from the turbine. The periodic repetitive changing from hot to cold is accomplished by a recessed portion (50) within the rotor (48). Each time the rotor makes a full rotation, the temperature changes completely as half of the circumference of the rotor is recessed. In another embodiment, the recessed portion is in a helical Archimedes curve shape allowing a more gentle effect. The device maintains a constant flow of combined hot and cold water regardless of the temperature change.

10 Claims, 3 Drawing Sheets

ADJUSTABLE WATER TEMPERATURE CYCLING DEVICE

TECHNICAL FIELD

The present invention relates to cycling fluid valves in general and more specifically to shower directed valves that cycle from hot to cold water in succession with the flow remaining the same but the cycle rate adjustable in time duration.

BACKGROUND ART

Previously attempts have been made to provide therapeutic cycling of hot and cold water in a shower or have attempted to automate the water system allowing such a purpose to be accomplished.

A search of the prior art did not disclose any patents that read directly on the claims of the instant invention however, the following U.S. patents were considered related:

| U.S. PAT. NO. | INVENTOR | ISSUED | |
|---|---|---|---|
| 4,696,428 | Shakalis | 29 September | 1987 |
| 4,693,415 | Sturm | 15 September | 1987 |
| 4,563,780 | Pollack | 14 January | 1986 |
| 3,458,874 | Fritz | 5 August | 1969 |
| 3,450,159 | Wilkin | 17 June | 1969 |

Shakalis teaches an electrically controlled hot/cold water system with an automatic mixing valve controlled by temperature sensors and a programmable controller. Cycling could be accomplished only if the controller were programmed for that purpose.

Sturm utilizes a method of controlling a sanitary mixer for hot or cold water. This is accomplished by comparing the actual temperature of the premixed water with a preset temperature using electronic controls. Two separate time varying regulating valves are used for electromechanical adjustment with a preset flow rate of the mixed water kept constant.

Pollack discloses an automatic computer controlled bathroom including shower and bathtub sensors adjusting hot and cold water temperatures through electromechanical valves well known in the art. Individual temperatures are preset for each family member on a programmable computer.

Fritz attempts to solve the problem of cycling water from hot to cold in rapid sequence within a shower by using a pair of serge manifolds each having a wiper blade inside with a series of outlet holes in each manifold projecting water in jet spray streams toward the user. The manifolds accept the cold water on one side of a bar and hot water on the other. When the bar oscillates at about 4 to 7 times per second, the water is dispersed from alternating sources. A motor equipped with an output drive gear meshes eccentrially with driven gears and links to drive the valve bars in the manifold. The object of the Fritz patent is to provide hot and cold water at a rapid rate such that before the human's system detects discomfort of one temperature extreme, the opposite temperature is applied.

Wilkin directs his attention to a regulating device for water faucets delivering hot and cold water under controlled conditions. Each water line contains a solenoid valvemotor that opens or closes by electrical energization. Mixing is accomplished by driving the motor to the desired position. Cycling may be accomplished by energizing each button alternatively however, not automatically.

DISCLOSURE OF THE INVENTION

It has long been known that the treatment of using repetitive hot and cold water temperatures has beneficial therapeutic effects upon the human body. Showers with water can be easily utilized for this treatment since water is easily heated or is cold in its normally transported mode through pipes in the ground. Attempts have been made to combine temperatures with water flow however, they have been expensive and cumbersome at best. It is therefore a primary object of the invention to provide a device that produces cycling of hot and cold water in a recurrent and interrupted manner. This invention therefore allows hot and cold water, that by themselves would be unbearable, or at least uncomfortable due to the extremes, to be alternated in such a sequence that the human body can sense the change through sensory perception within the nervous system, one extreme temperature is changed to the other creating a stimulating but comfortable reaction. In other words, the invention operates at a cyclic rate that allows the human system to detect a temperature change. It is this detectable change that stimulates the body and provides the therapeutic effect.

An important object of the invention relates to the ability of the system to supply a constant flow of water regardless of the cycle rate. This allows the user to adjust the volume to a comfortable condition with jets of water in a shower head impinging upon the body at a constant and comfortable measure.

An important object of the invention allows this constant flow rate to be maintained while changing the cyclic speed independentally. This is accomplished by bypassing some of the flow directly to the shower head while the balance operates the rotating mechanism governing the speed. It has been found that from 0.1 to 1 cycle per second is the optimum adjustable speed that allows the senses to not feel discomfort while the therapeutic effect is maintained at its maximum.

Still another object of the invention utilizes only the water flow to drive the cyclic mechanism. This allows a simple mechancial device to be added into the flow stream without complicated and expensive electromechanical components. Further, the adjustment of the hot water may be made independently eliminating the possibility of being burned by the water if the temperature supplied in the facility is excessively hot. An optional safety system may also be incorporated utilizing a material that melts at a predetermined temperature bypassing the water from contact with the body.

Yet another object of the invention lies in the ability of the apparatus to be made integral with a shower head minimizing the modifications necessary to utilize this invention into conventional plumbing systems within homes and institutions.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
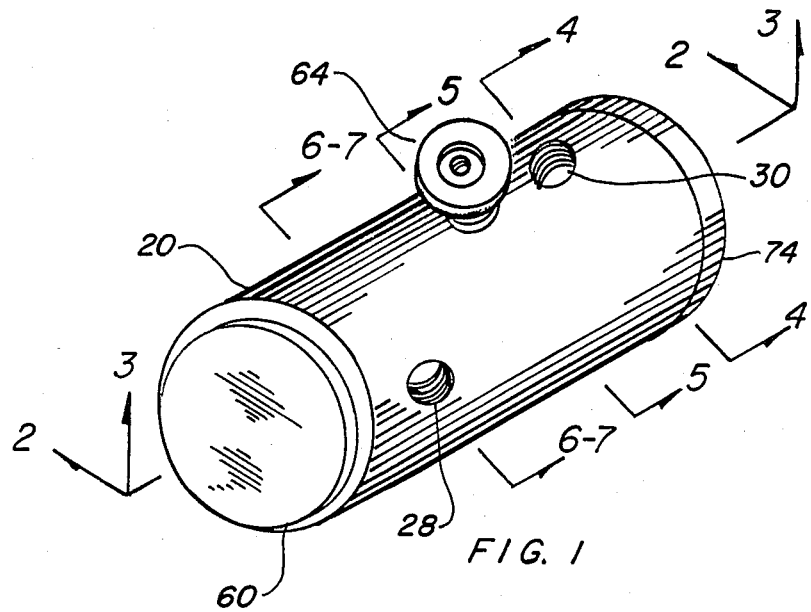
FIG. 1 is a partial isometric view of the preferred embodiment.
Figures 2, 3:
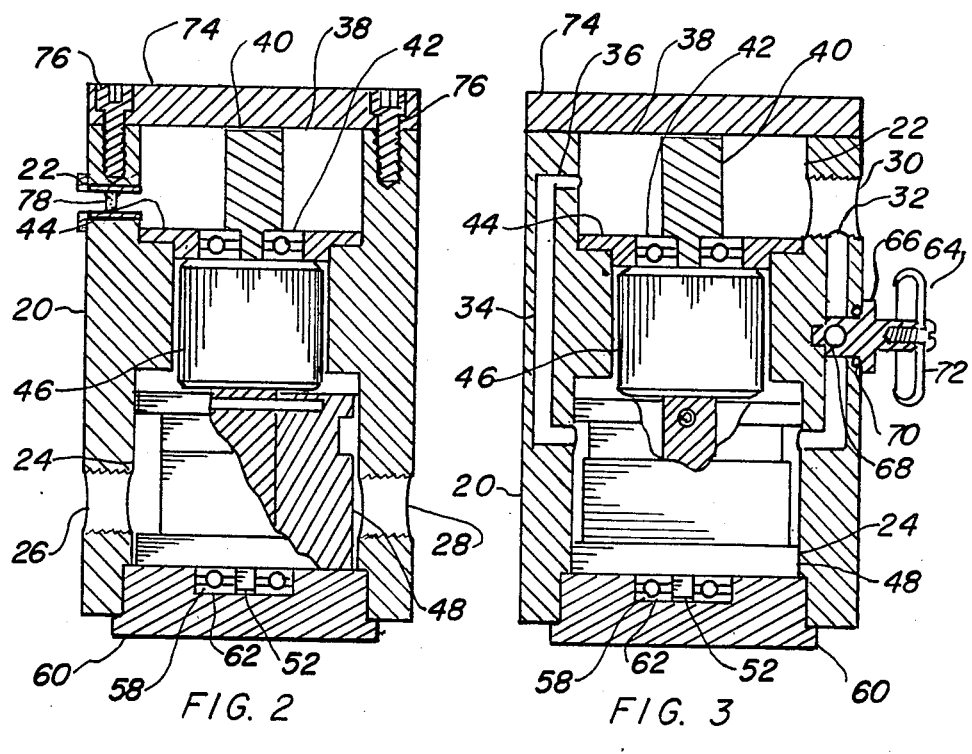
FIG. 2 is a cross-section view taken along lines 2—2 of FIG. 1.
FIG. 3 is a cross-sectional view taken along lines 3—3 of FIG. 1 depicting the bypass and jet gallerys.
Figure 4:
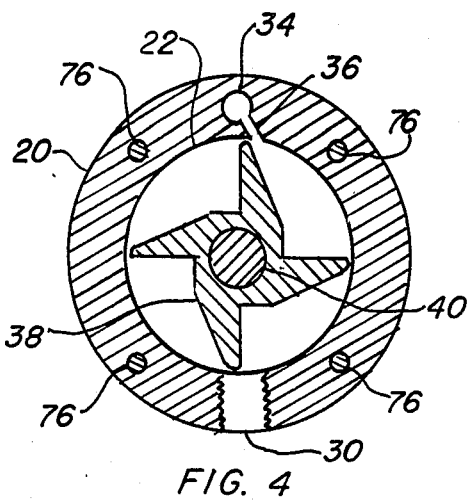
FIG. 4 is a cross-sectional view taken along lines 4—4 of FIG. 1 illustrating the turbine within the distribution chamber and the jet outlet.
Figure 5:
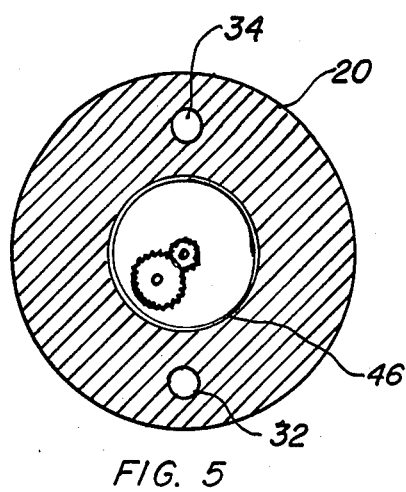
FIG. 5 is a cross-sectional view taken along lines 5—5 of FIG. 1 showing the speed reducing gear train.

The preferred embodiment, as shown in FIGS. 1 through 9 is comprised of a body 20 in hollow circular shape made preferably of metal or thermoplastic. The body 20 may be cast and machined or injection molded or any other process suitable for the application. In any event, the hollow interior of the body 20 contains a drive chamber 22 on one end and a distribution chamber 24 on the other. Integral with the body 20 is a hot water inlet port 26 and a cold water inlet port 28 in direct opposite alignment within the distribution chamber 24. An outlet port 30 is located in the sidewall of the body in the drive chamber 22. FIGS. 2 and 3 illustrate the relationship of the ports and a bypass gallery 32 is positioned between the distribution chamber 24 and the outlet port 30 such that the flow of water may be diverted around the balance of the system. An angular orificed jet gallery 34 is positioned opposite the bypass gallery 32 and is in communication with both the distribution chamber 24 and the drive chamber 22. This jet gallery 34 has a relatively small angular orifice 36 at the point entering the drive chamber 22 and is positioned at an angle relative to the centerline. This is best depicted in FIG. 4 and serves the purpose of supplying a jet of water into the drive chamber at a relatively high velocity and at the most desirable drive angle.

Figure 9:
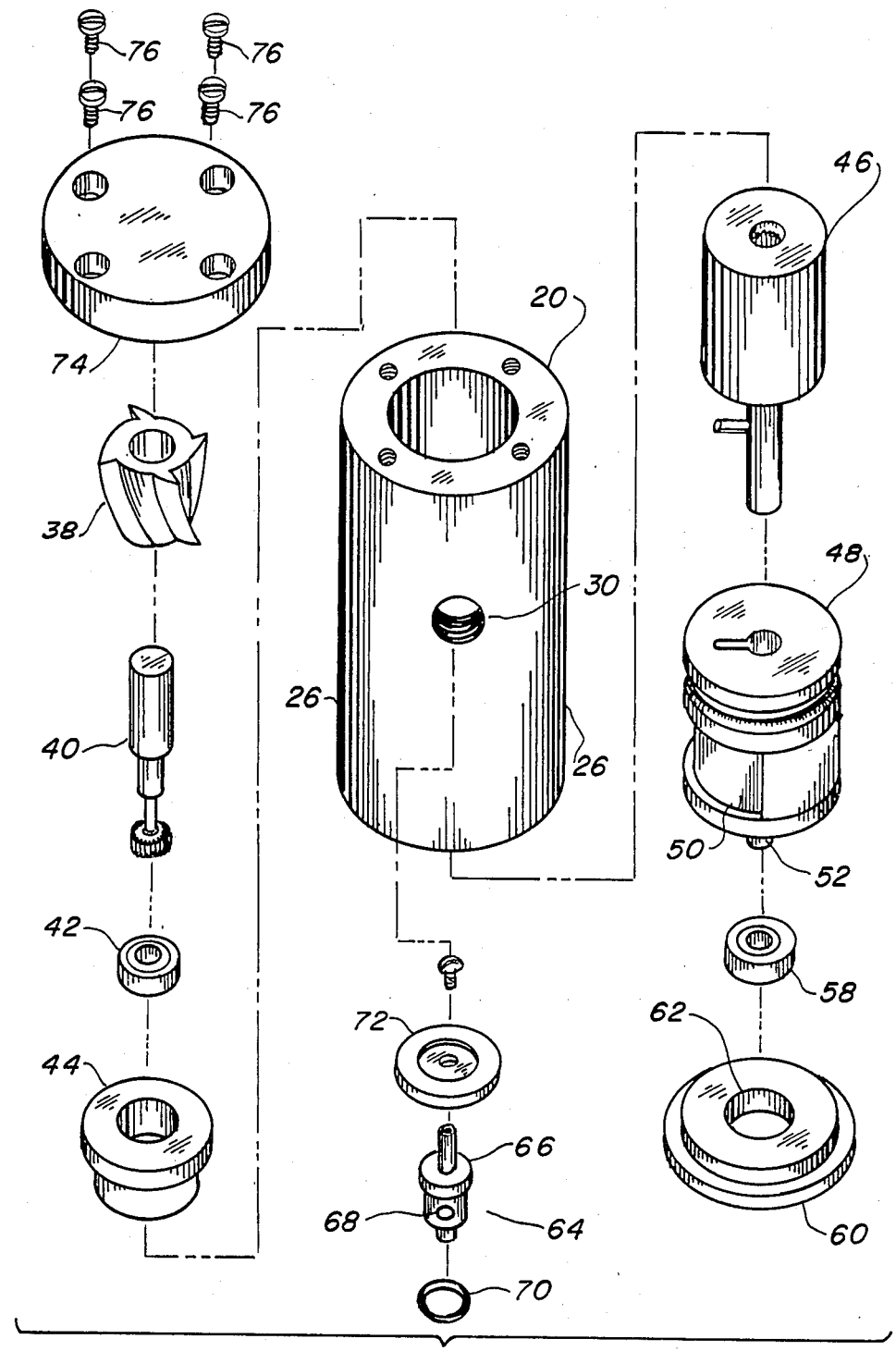
FIG. 9 is an exploded view of the preferred embodiment with the elements illustrated on the left being within the drive chamber and the elements shown on the right housed with the distribution chamber also the flow regulating valve is exploded from the body at the center bottom.

Water propelled drive means are accomplished by the use of a turbine 38 having a plurality of blades. The blades are curved, as depicted in FIG. 9 to allow them to apply a slight force toward the distribution chamber 24 to prevent the turbine wheel 38 from coming out of its shaft 40. The blades of the turbine 38 are in direct alignment with the angular orifice 36 in the jet gallery 34 such that the flow of water through the orifice impinges directly upon the blades changing linear flow to rotational torsional force.

A turbine shaft 40 is centrally located within the turbine 38 and distends creating a drive line to transfer the torque from the turbine when rotated. The shaft 40 is retained by a bearing 42 that is located in a turbine bearing sleeve 44. This sleeve 44 is located within the drive chamber 22 and becomes not only a bearing retainer but acts to isolate the drive chamber 22 from the distribution chamber 24. The bearing 42 is pressed into a recess in the sleeve allowing the shaft 40 to rotate freely while supporting the turbine 38. A tight fit between the drive chamber 22 and bearing 42 prevent leakage between chambers.

A speed reducing gear train 46 having a driven shaft, is attached on one end to the turbine shaft 40 and the integral driven shaft distends at the other end continuing the drive line. The gear train 46 reduces the rotary motion of the turbine 38 causing the cycling mechanism of the device to rotate at a speed sensory to humans. It has been found that from 0.1 to 1 cycle per second is the optimum speed that allows the human senses to not feel discomfort while the therapeutic effect is maintained at its maximum. The type of gears within the train 46 may be spur gears, worm and pinion gears or planetary gears. Any other gear arrangement may be suitable for the application and this disclosure does not limit the use of state-of-the-art speed reduction for this application.

Means to cycle hot or cold water within the device over a time duration consists of a rotor 48 having a cavity 50 on one side. The rotor is conformed such that when rotated within the distribution chamber 24, the passing of hot or cold water alternatively is accomplished through the flow of either the opposed hot or cold water through the ports 26 or 28 creating the cycling effect of water temperature. The rotor 48 has means to receive the gear train 46 driven shaft on one end and a stub shaft 52 on the other. The rotor 48 recessed portion 50 is between the shaft ends and is in equal alinement longitudinally with the hot and cold water ports 26 and 28. Rotation of the rotor 48 alternatively blocks or is in communication with the recess 50 accomplishing the successive and repetitive flow characteristics.

Figure 7:
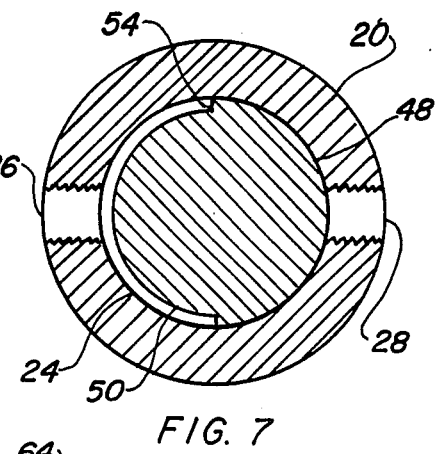
FIG. 7 is a cross-sectional view taken along line 7—7 of FIG. 1 illustrating the rotor where the recessed portion is half of the diameter of the rotor.
Figure 8:
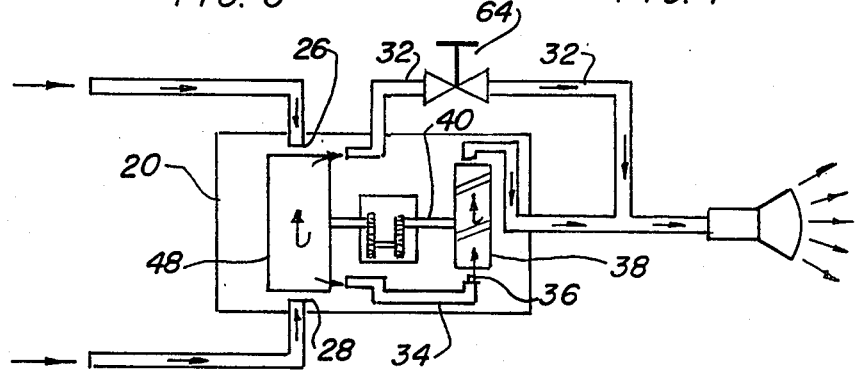
FIG. 8 is a schematic diagram indicating the water flow path in relation to the rotating and adjustable elements.

The recessed portion of the rotor 48 may be half the circumference 54 of the rotor as shown in FIG. 7. This configuration allows an incremental amount of water of each temperature, hot or cold, to be furnished with each rotation of the rotor 48. This embodiment provides an instantaneous square wave (on-off) temperature change with each rotation of the rotor and maintains the output pressure constant.

Figure 6:
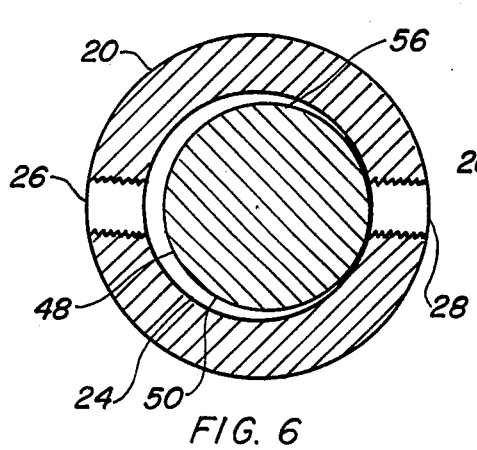
FIG. 6 is a cross-sectional view taken along lines 6—6 of FIG. 1 illustrating the rotor where the recessed portion is an offset circular shape.

Another embodiment, as shown in FIG. 6, operates identically as the first embodiment but uses a rotor 48 having a recessed portion 50 that is in a circular shape 56 and offset within the chamber 24. This shape allows a modulating amount of hot or cold water to be furnished alternately with each rotation. The probable profile followed by this shape is a dual helical Archimedes curve, that is, one half of the curve is clockwise and the other is counter-clockwise. This curve design allows a linear change of water volume in the cavity with uniform rotation and maintains the output pressure constant. Thus, providing a gradual mixing of each temperature until at one point of the rotation, only one temperature is produced and then gradually changes until the opposite temperature is created. The temperature change provided by this embodiment follows an approximate sine curve. Both embodiments allow the cyclic effect to be felt by the user with the first embodiment providing the user with a stronger stimulation and the second with a much more gentle stimulation.

A rotor bearing 58 is pressed upon the rotor stub shaft 52 allowing reduced functional resistance when rotated by the gear train 46. This bearing 58 is centrally located with a bore 62 in a rotor cover plate 60. This plate 60 not only retains the rotor bearings 58 but encloses the body 20 in a watertight manner as it is positioned at the end of chamber 24.

It will be understood that the flow of the water, once the hot side has been regulated to a temperature not damaging to the human body, will be at a constant volume. The cyclic speed is therefore not regulated by volume but instead the means to regulate speed is governed by the use of a flow regulating valve 64 positioned in the bypass gallery 32.

This valve 64 decreases or increases the flow of water in the bypass gallery 32. If more water bypasses the turbine 38 speed is decreased in an inversely proportional manner. The bypass gallery 32 functions by passing water from the distribution chamber 24, either hot or cold, directly to the outlet port 30. The valve 64 itself consists of a cylindrical member 66 having an opening 68 therein that interfaces with the bypass gallery 32 and an 0-ring 70 that is disposed between the body 20 and the member 66 which seals the valve watertight and yet allows rotation. A hand-wheel 72 completes the valve providing manual manipulation of the valve from the outside as it is directly connected to the member 66.

The final sealing element is a turbine cover plate 74 that is attached to the drive chamber end of the body 20. This plate may be attached in any manner however, threaded fasteners in the form of screws 76 are preferred allowing easy access into the interior of the device.

A protective feature may be incorporated into the invention but is not necessary for its ultimate function. This feature consists of a heat sensitive fuse 78 located, as shown in FIG. 2, within the body 20 at an interface with the drive chamber. The fuse 78 is designed to melt at temperatures above 60° C., within two seconds, to allow the water to flow out the sides of the body 20 away from the person taking a shower. Thus protecting the user from being burned if the device is applied to systems having very high temperature hot water that could be hazardous to the user.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

We claim:

1. An adjustable water temperature cycling device comprising:
   (a) a body having hot and cold water inlet ports, an outlet port and a plurality of chambers interconnected therebetween,
   (b) water propelled drive means characterized by the flow of water into one of said chambers forceably rotating said drive means such that torque is produced, said water propelled drive means having a turbine wheel and said body having an angular orifice within one of said chambers wherein the flow of water produces a jet-like stream impinging directly upon the turbine wheel changing the linear flow of water to rotational force driving the cycling means therewith, further having a speed reducing gear train directly connected on one end to said turbine and on the other end to the cycling means defining a reduction in rotary motion of the turbine thereby causing the cycling means to rotate at a speed sensory to humans,
   (c) means to cycle hot or cold water within the device over a time duration connected directly to said water propelled drive means and urged by the rotational force thereof, and
   (d) means to regulate speed of cycling integral with said body and manually adjusted governing the flow of water to said drive means increasing or decreasing the rotational speed in proportion to the flow of water.

2. An adjustable water temperature cycling device comprising:
   (a) a body having hot and cold water inlet ports, an outlet port and a plurality of chambers interconnected therebetween,
   (b) water propelled drive means characterized by the flow of water into one of said chambers forceably rotating said drive means such that torque is produced,
   (c) means to cycle hot or cold water within the device over a time duration connected directly to said water propelled drive means and urged by the rotational force thereof, said means to cycle having a rotor with a recessed portion on one side conformed such that when rotated within one of the chambers in the body, the passing of alternating hot or cold water from said inlet ports is permitted thereby creating the cycling of water temperature, and
   (d) means to regulate speed of cycling integral with said body and manually adjusted governing the flow of water to said drive means increasing or decreasing the rotational speed in proportion to the flow of water.

3. An adjustable water temperature cycling device comprising:
   (a) a hollow cylindrical body having, a hot and cold water inlet port, an outlet port, distribution and drive chambers, a bypass gallery in communication with said distribution chamber and said outlet portions, an angular orificed jet gallery between said mixing chamber and said drive chamber,
   (b) a turbine having a plurality of blades housed within said drive chamber with said blades in alinement with said jet gallery angular orifice such that the flow of water through the orifice impinges directly upon the turbine blades creating rotational torsional force,
   (c) a turbine shaft centrally located within the turbine and distending therefrom creating a drive line to transfer torque from the turbine when rotated,
   (d) a turbine shaft bearing retained around said shaft reducing the frictional resistance of the turbine when rotated,
   (e) a turbine bearing sleeve positioned within the drive chamber isolating the chamber from communication with other areas of the hollow body also said sleeve having a recess to retain said shaft bearing allowing the shaft to rotate freely while supporting the turbine thereupon,
   (f) a speed reducing gear train having a driven shaft attached to said turbine shaft decreasing the rotational speed of the turbine such that human sensory perception can feel the cycling effect caused by the rotation of the device,
   (g) a rotor having means to receive said gear train driven shaft on one end and a stub shaft on the other said rotor further having a recessed portion between the shaft ends in line with said hot water inlet port and said cold water inlet port with said turbine rotated by the gear train allowing alternate ports to be either blocked or in communication therewith providing a metered flow of water to enter the distribution chamber cycling the flow from either of the ports in a successive and repetitive manner, (h) a rotor bearing pressed upon the rotor stub shaft allowing reduced frictional resistance when rotated by the gear train, (i) a turbine cover plate attached to one end of the hollow body over said drive chamber to enclose the body in a watertight manner, (j) a rotor cover plate attached to the end of the body opposite the turbine plate to enclose the body in a watertight manner, said rotor plate further having a bore to retain said rotor bearing allowing the rotor to revolve freely when supported between the stub shaft and the gear train, and (k) a flow regulating valve positioned integrally with the body restricting said bypass gallery such that when water is introduced into the interior of the body through either the hot or cold water port water flow is bypassed directly to the outlet port reducing the flow in said jet gallery decreasing the speed of the turbine and hence the speed of the rotor slowing down the cyclic rate of the water as it passes alternatively through the recessed portion of the rotor either hot or cold creating an adjustable amplitude of recurrent temperature change without affecting the flow rate of the water.

4. The water temperature cycling device as recited in claim 3 wherein said speed reducing gear train further comprises spur gears engagingly positioned together within a housing.

5. The water temperature cycling device as recited in claim 3 wherein said speed reducing gear train further comprises a combination of worm and pinion gears engagingly positioned together within a housing.

6. The water temperature cycling device as recited in claim 3 wherein said speed reducing gear train further comprises planetary gears engagingly positioned within a housing.

7. The water temperature cycling device as recited in claim 3 wherein said rotor recessed portion further comprises half the circumference of the rotor allowing an equal amount of hot or cold water to be furnished interrupting the flow of each temperature in an incremental manner once with each rotation, the profile of the rotation allows the temperature change to follow a square wave shape and maintains the output pressure constant.

8. The water temperature cycling device as recited in claim 3 wherein said rotor recessed portion further comprises an offset circular shape that allows a modulating amount of hot or cold water to be furnished alternately with each rotation, the profile followed by said shape is a dual helical Archimedes curve that allows a linear change of water volume in said cavity with uniform rotation and maintains the output pressure constant with the temperature change following an approximate sine curve.

9. The water temperature cycling device as recited in claim 3 wherein said flow regulating valve further comprises a cylindrical member having an opening therein interfacing with said body, an O-ring disposed between said body and said member for sealing therewith, and a hand-wheel attached to the member for manual manipulation therewith.

10. The water temperature cycling device as recited in claim 3 further comprising a heat sensitive fuse located within said body at an interface with said drive chamber, where said fuse melts at a temperature above 60° C. to allow the water to flow out the side of said body away from the person taking a shower.

* * * * *